US006981162B2

(12) United States Patent
Chang et al.

(10) Patent No.: US 6,981,162 B2
(45) Date of Patent: Dec. 27, 2005

(54) SUSPEND-TO-RAM CONTROLLING CIRCUIT

(75) Inventors: Nai-Shung Chang, Chungho (TW); Tsai-Sheng Chen, Chungho (TW)

(73) Assignee: Via Technologies, Inc., Taipei Hsien (TW)

( * ) Notice: Subject to any disclaimer, the term of this patent is extended or adjusted under 35 U.S.C. 154(b) by 608 days.

(21) Appl. No.: 10/156,148

(22) Filed: May 29, 2002

(65) Prior Publication Data

US 2003/0097599 A1 May 22, 2003

(30) Foreign Application Priority Data

Nov. 16, 2001 (TW) .............................. 90128523 A

(51) Int. Cl.7 ................................................ G06F 1/28
(52) U.S. Cl. ...................................... 713/310; 713/320
(58) Field of Search ............................... 713/300, 310, 713/320, 323, 324; 711/100, 104; 365/227, 365/228; 327/107

(56) References Cited

U.S. PATENT DOCUMENTS

| | | | | |
|---|---|---|---|---|
| 5,612,664 | A * | 3/1997 | Hilgenberg et al. | 338/295 |
| 6,557,071 | B2 * | 4/2003 | Stolt et al. | 711/105 |

* cited by examiner

*Primary Examiner*—Thuan Du
(74) *Attorney, Agent, or Firm*—Rosenberg, Klein & Lee

(57) ABSTRACT

A suspend-to-RAM controlling circuit includes a RAM (random access memory) controller, a logic circuit and at least one RAM module. The RAM controller has a controlling pin connected to the logic circuit. Each of the RAM modules has a first enable pin and a second enable pin connected to output pins of the logic circuit. The RAM module is driven to the STR (suspend-to-RAM) state after receiving an STR signal from the logic circuit. Therefore, the RAM controller can provide STR signals to a plurality of RAM modules by only one controlling pin in incorporation with the logic circuit.

17 Claims, 3 Drawing Sheets

SUSPEND-TO-RAM CONTROLLING CIRCUIT

FIELD OF THE INVENTION

The present invention relates to a suspend-to-RAM controlling circuit, especially to a suspend-to-RAM controlling circuit with a RAM controller, which can provide a plurality of STR signals to a plurality of RAM modules by only one controlling pin in incorporation with the logic circuit.

BACKGROUND OF THE INVENTION

The official specification of ATM motherboard was released by Intel, wherein the power supply can be manipulated by the computer system itself instead of the mechanical switch. Afterward, an ACPI (advanced configuration and power interface) specification is developed by Intel, Microsoft and Toshiba to implement power management functions in the operation system. The ACPI specification switches a computer between five states according to system's current activity. The states represent the further reduction in power use and are as follows: S1, S2: power on suspend, S3: suspend to RAM, S4: suspend to disk, and S5: Soft-off. In the suspend-to-RAM state, the components on the motherboard, including the clock generator and CPU, are stopped except the real-time clock.

The conventional control circuit for the suspend—to RAM mode is shown in FIG. 1, which comprises a RAM controller 10*a* (generally arranged in the North bridge chip) connected to a RAM 20*a* (composed of RAM modules m1–m3). The RAM controller 10*a* has control pins J1–J6 connected to the first enable pin CKE0 and the second enable pin CKE1 of the RAM modules m1–m3, respectively. Therefore, the RAM controller 10*a* can trigger the RAM modules m1–m3 into the suspend to RAM mode through the control pins J1–J6, wherein the computer system stops all executing programs and stores operational parameters into the RAM modules m1–m3. At this time, the power consumption is greatly reduced.

However, the nowaday computer system generally requires a large amount of RAM modules (for example, in server application), for example, 8 RAM modules. In this concern, the RAM controller 10*a* needs more reserved control pins for connecting to the first enable pin CKE0 and the second enable pin CKE1 of the RAM modules. Conventionally, the control pins are increased at the expense of the memory debug pins DQM0–DQM7 and ECCD0–ECCD7 or other pins. Alternatively, the control pins are increased by increasing the pin count of the RAM controller 10*a*. In the former case, the dedicated function provided by the memory debug pins DQM0–DQM7 and ECCD0–ECCD7 are sacrificed. In the later case, the complexity of the North bridge chip design and cost are increased.

SUMMARY OF THE INVENTION

It is the object of the present invention to provide a suspend-to-RAM controlling circuit with a RAM controller, which can provide a plurality of STR signals to a plurality of RAM modules by only one controlling pin in incorporation with the logic circuit. The RAM controller does not need extra pins or modified pins to save cost and power.

To achieve above object, the present invention provides a suspend-to-RAM controlling circuit comprises a RAM (random access memory) controller, a logic circuit and at least one RAM module. The RAM controller has a controlling pin connected to the logic circuit and generates a controlling signal in command of a computer system. The logic circuit has an input pin and a plurality of output pins and is divided into at least one serial stage. The first stage is connected to the controlling pin through the input pin. Each of the serial stage has two output pins to provide two STR signals to the RAM modules. When the logic circuit is triggered by the controlling signal, each of the serial stages generates a STR signal to the corresponding RAM module through the output pins thereof. The STR signals sent to each of the RAM modules comprises a first enable signal and a second enable signal, and wherein the first enable signal and the second enable signal are offset by one clock. Each of the RAM modules comprises a first enable pin corresponding to and driven by the first enable signal and a second enable pin corresponding to and driven by the second enable signal. When the RAM module is triggered by the first enable signal through the first enable pin thereof and the second enable signal through the second enable pin thereof, the RAM module is driven to the STR state.

In the preferred embodiment of the present invention, each of the serial stages comprises two serially connected flip-flops. A first flip-flop outputs a first enable signal for the serial stage thereof in response to a second enable signal of the previous serial stage. A second flip-flop outputs a second enable signal for the serial stage thereof in response to the first enable signal thereof. The flip-flop can be selected from one of the D flip-flop, JK flip-flop and T flip-flop.

The various objects and advantages of the present invention will be more readily understood from the following detailed description when read in conjunction with the appended drawing, in which:

DETAILED DESCRIPTION OF THE INVENTION

Figure 1:
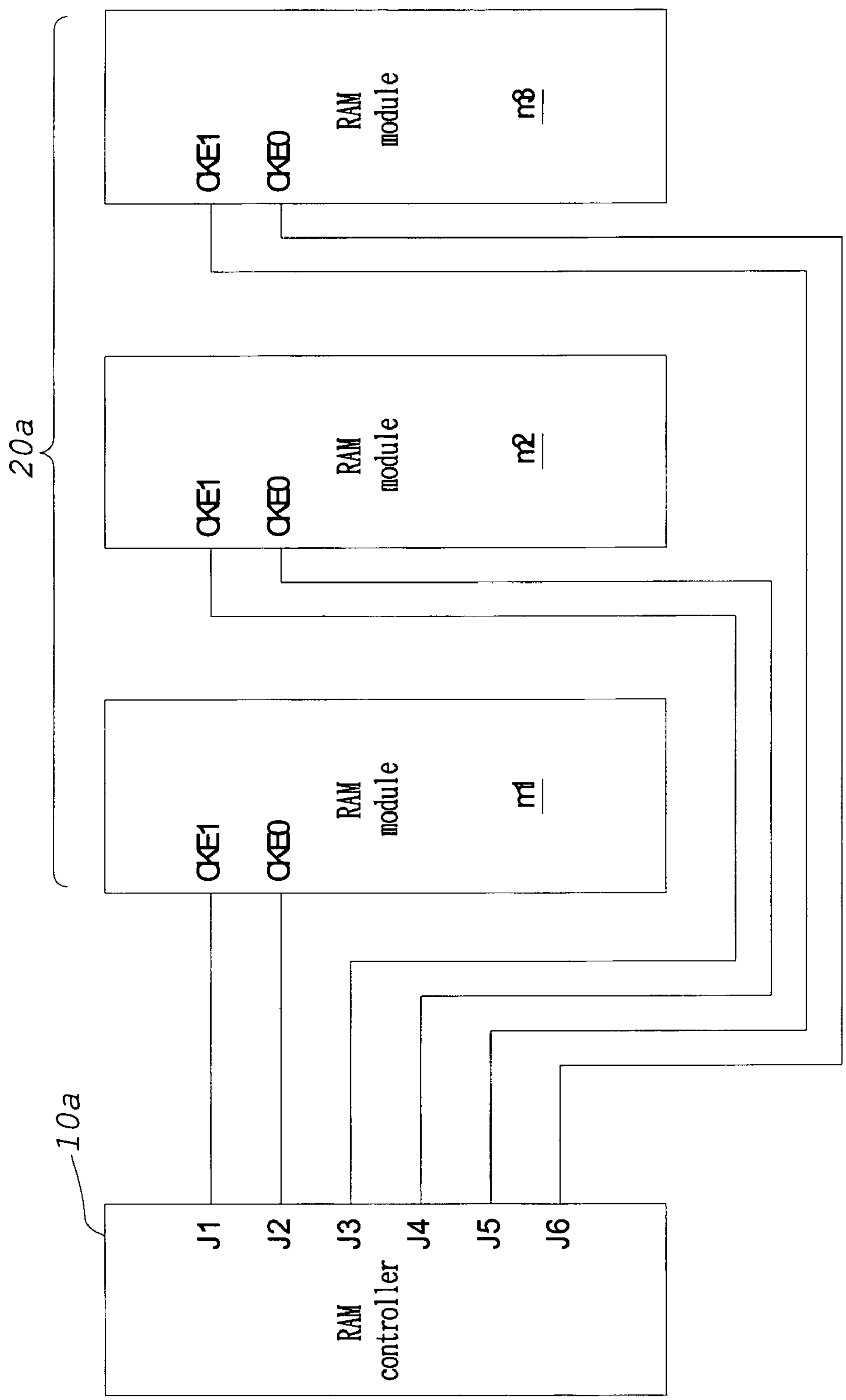
FIG. 1 shows prior art suspend-to-RAM controlling circuit.
Figure 2:
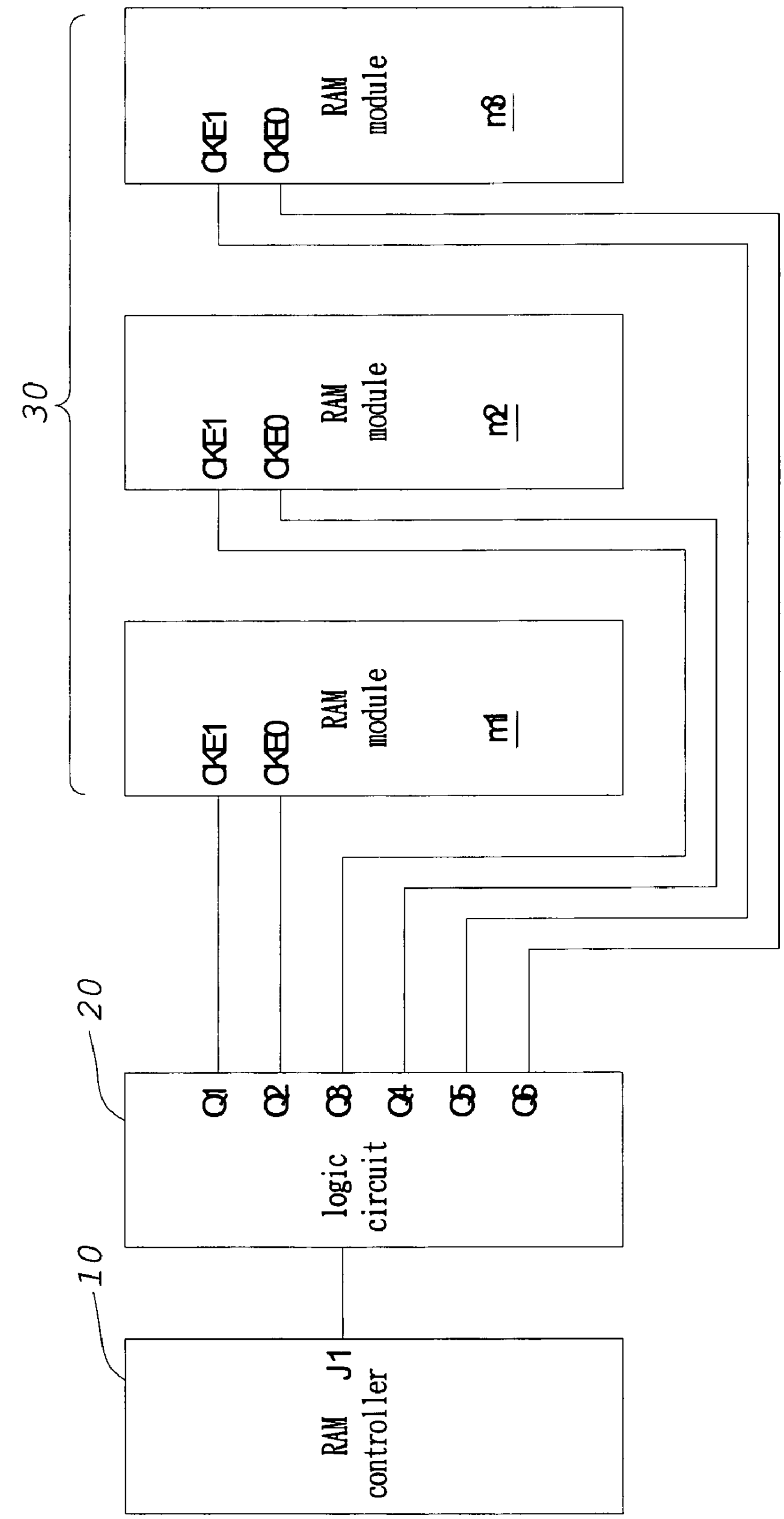
FIG. 2 shows the block diagram of the present invention.
Figure 2A:
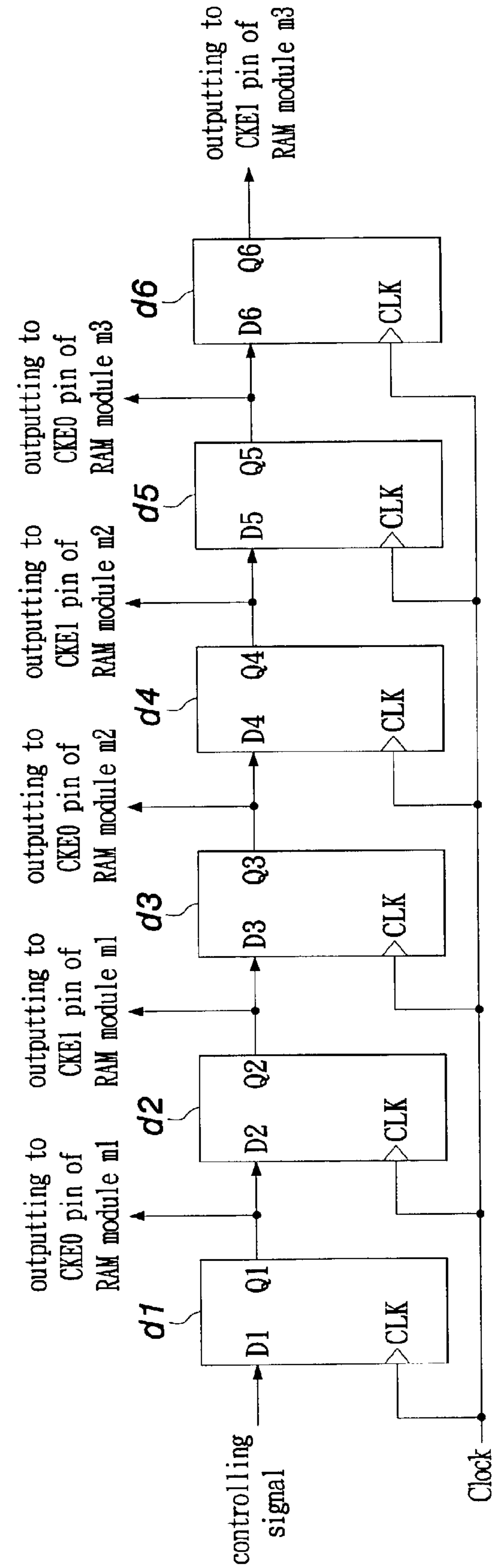
FIG. 2A shows the detailed circuit of logic circuit.

FIG. 2 shows the block diagram of the present invention. The present invention is intended to provide a suspend-to-RAM controlling circuit comprising a RAM controller 10 (arranged in the north bridge chip), a logic circuit 20 and a RAM device 30 with a plurality of RAM modules. The RAM controller 10 has a controlling pin J1. The logic circuit 20 is connected to the RAM controller 10 and comprises a plurality of D flip-flops d1–d6 in series connection. The circuit diagram of the logic circuit 20 is shown in FIG. 2A. The RAM device 30 comprises a plurality of RAM modules m1–m3 and the number of the RAM modules varies according to some specific applications. Each of the RAM modules m1–m3 has a first enable pin CKE0 and a second enable pin CKE1, which are connected to the output pins Q1–Q6 of the logic circuit 20 (i.e., the output of the flip flops d1–d6). As shown in FIG. 2, in a suspend-to-RAM signal sent to each RAM module, the second enable signal from the second enable pin CKE1 is delayed by one clock in comparison with the first enable signal from the first enable pin CKE0. For example, the pair of suspend-to-RAM signals sent to the RAM module m1 by the first enable pin CKE0 and the second enable pin CKE1, respectively are offset by one clock. Moreover, in those serially connected RAM modules, the first enable signal received by one RAM module is delayed by one clock in comparison with the second enable signal received by the previous RAM module. For example, the first enable signal from the first enable pin CKE0 in the RAM module m2 is delayed by one clock in comparison with the second enable signal from the second enable pin CKE1 in the RAM module m1. Moreover, the first enable signal from the first enable pin CKE0 in the RAM module m3 is delayed by one clock in comparison with the second enable signal from the second enable pin CKE1 in the RAM module m2. The RAM module enters to the suspend-to-RAM after receiving the suspend-to-RAM signal.

In the FIG. 2A, the input pin D1 of the flip flop d1 is connected to a controlling pin J1 of the RAM controller 10 to control the operation of the logic circuit 20. The flip flops d1 and d2, d3 and d4, and d5 and d6 form three serial stages, respectively, for three RAM modules. After the flip flop d1 receives the controlling signal from the controlling pin J1, the output pins Q1–Q6 of the flip flops d1–d6 sequentially generate suspend-to-RAM signals to the RAM modules m1–m3. The suspend-to-RAM signals are delayed by one clock, respectively, and sent to the RAM modules m1–m3 through the first enable pin CKE0 and the second enable pin CKE1. The suspend-to-RAM signals for the RAM modules m1–m3 can be generated through the logic circuit 20 shown in FIG. 2A. It should be noted that the commercially available logic block contains the function of the logic circuit 20. Therefore, the logic circuit 20 can be integrated within the RAM controller 10 while designed. The pin count of the north bridge chip can be reduced and the package cost is also reduced.

If the number of the RAM module 30 increases, the logic circuit 20 is adapted to have more serial stages and the pin count of the RAM controller 10 needs not to increase accordingly. The logic circuit 20 can support an arbitrary number of RAM modules as long as the number of the serial stages of the logic circuit 20 is larger than that of the RAM modules.

In this specification, the logic circuit 20 is exemplified by D flip-flop. However, the logic circuit 20 can also implemented by JK flip-flop, T flip-flop or other logic circuit as long as the logic circuit can generate a delayed output.

Moreover, the inventive controlling circuit can be applied to any motherboard, computer system with the STR (suspend-to-RAM) function. The inventive controlling circuit can also be applied to DDR (double data rate) memory for the suspend-to-RAM operation.

To sum up, according to the inventive controlling circuit, the north bridge chip can send STR (suspend-to-RAM) signals to the RAM devices through the buffers of the logic circuit. The pin count and circuit complexity of the north bridge chip are reduced and the package cost is also reduced.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A computer system with a STR (suspend-to-RAM) state, comprising at least:

a RAM (random access memory) controller with a controlling pin, the RAM controller being controlled by the computer system for generating a controlling signal, and wherein the controlling signal is for driving the computer system to the STR state;

a logic circuit having an input pin connected to the controlling pin and a plurality of output pins, the output pins outputting at least one STR signal when the input pin is triggered by the controlling signal, the logic circuit including a plurality of serially connected logic elements, the input pin being an input of a first of the plurality of logic elements and the output pins being respective outputs of the plurality of logic elements; and at least one memory module, each of the memory modules having a first enable pin and a second enable pin for receiving the STR signals corresponding to the memory module, and wherein the memory module enters to the STR state when the first enable pin and the second enable pin are triggered by the STR signals.

2. The computer system as in claim 1, wherein the RAM controller is incorporated into a north bridge chip.

3. The computer system as in claim 1, wherein the plurality of serially connected logic elements are each selected from one of a D flip-flop, JK flip-flop, and T flip-flop.

4. The computer system as in claim 1, wherein the STR signals outputted from adjacent output pins of the logic circuit are offset by one clock.

5. The computer system as in claim 1, wherein the STR signals sent to each of the RAM modules comprises a first enable signal and a second enable signal, the second enable signal are offset by one clock in comparison with the first enable clock.

6. The computer system as in claim 5, wherein the RAM module enters to STR state when the first enable pin and the second enable pin are driven by the first enable signal and the second enable signal respectively.

7. The computer system as in claim 1, wherein the plurality of serial logic elements are defined by a plurality of serial stages, each of the serial stages comprising:

a first flip-flop outputting the first enable signal for the serial stage thereof in response to the second enable signal of the previous serial stage; and a second flip-flop outputting a second enable signal for the serial stage thereof in response to the first enable signal thereof.

8. The computer system as in claim 7, wherein the first flip-flop in a first serial stage outputs the first enable signal for the first serial stage thereof in response to the controlling signal.

9. The computer system as in claim 8, wherein the number of the serial stages is not less than the number of the RAM modules.

10. A controlling circuit for driving a computer system to a STR (suspend-to-RAM) state, comprising at least:

a RAM (random access memory) controller with a controlling pin, the RAM controller generating a controlling signal for driving the computer system into the STR state; and a logic circuit having an input pin connected to the controlling pin and a plurality of output pins, when the input pin receives the controlling signal, the output pins output at least one STR signals to a plurality of RAM modules in the computer system, the logic circuit including a plurality of flip-flops serially coupled wherein the output of one flip-flop is coupled to the input of the next flip-flop and a respective one of the output pins, a first of the serially coupled flip-flops having an input coupled to the input pin.

11. The controlling circuit as in claim 10, wherein each of the RAM modules receives a corresponding STR signal, each of the STR signals being sent to a corresponding RAM module having a first enable signal and a second enable signal, the first enable signal and the second enable signal are offset by one clock.

12. The controlling circuit as in claim 11, wherein each of the RAM modules comprises a first enable pin; and a second enable pin;

when the RAM module is triggered by the first enable signal though the first enable pin thereof and the second enable signal though the second enable pin thereof, the RAM module is driven to the STR state.

13. The controlling circuit as in claim 10, wherein the plurality of serially coupled flip-flops are defined by a plurality of serial stages, each of the serial stages comprising:

a first flip-flop outputting a first enable signal for the serial stage thereof in response to a second enable signal of the previous serial stage; and a second flip-flop outputting a second enable signal for the serial stage thereof in response to the first enable signal thereof.

14. The controlling circuit as in claim 13, wherein the first flip-flop in a first serial stage outputs the first enable signal for the first serial stage in response to the controlling signal.

15. The controlling circuit as in claim 13, wherein the number of the serial stages is not less than the number of the RAM modules.

16. The controlling circuit as in claim 10, wherein the RAM module is a DDR (double data rate) memory.

17. The controlling circuit as in claim 10, wherein the RAM controller is incorporated into a north bridge chip.

* * * * *